US011614959B2

United States Patent
Avni et al.

(10) Patent No.: US 11,614,959 B2
(45) Date of Patent: Mar. 28, 2023

(54) COHERENCE PROTOCOL FOR HARDWARE TRANSACTIONAL MEMORY IN SHARED MEMORY USING NON VOLATILE MEMORY WITH LOG AND NO LOCK

(71) Applicant: HUAWEI TECHNOLOGIES CO., LTD., Guangdong (CN)

(72) Inventors: Hillel Avni, Munich (DE); Eliezer Levy, Munich (DE); Avi Mendelson, Munich (DE); Zuguang Wu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 814 days.

(21) Appl. No.: 15/873,731

(22) Filed: Jan. 17, 2018

(65) Prior Publication Data

US 2018/0143850 A1     May 24, 2018

Related U.S. Application Data

(63) Continuation of application No. PCT/EP2016/067403, filed on Jul. 21, 2016.

(30) Foreign Application Priority Data

Jul. 22, 2015   (WO) ................ PCT/EP2015/066802

(51) Int. Cl.
*G06F 9/46*        (2006.01)
*G06F 16/23*       (2019.01)
(Continued)

(52) U.S. Cl.
CPC .......... *G06F 9/467* (2013.01); *G06F 11/1441* (2013.01); *G06F 11/1471* (2013.01);
(Continued)

(58) Field of Classification Search
CPC .. G06F 11/1474; G06F 9/467; G06F 16/2365; G06F 11/1441; G06F 12/0868;
(Continued)

(56) References Cited

U.S. PATENT DOCUMENTS 5,369,757 A    11/1994  Spiro et al.
5,897,656 A     4/1999  Vogt et al.
(Continued)

FOREIGN PATENT DOCUMENTS

CN    101510162 A    8/2009
CN    101950259 A    1/2011
(Continued)

OTHER PUBLICATIONS

Wang et al., "Persistent Transactional Memory", IEEE Computer Architecture Letters, vol. 14, No. 1, Jan.-Jun. 2015, pp. 58-61. (Year: 2015).*

(Continued)

*Primary Examiner* — Daniel D Tsui
*Assistant Examiner* — Zubair Ahmed
(74) *Attorney, Agent, or Firm* — Leydig, Voit & Mayer, Ltd.

(57) ABSTRACT

The invention relates to a data processing system and a date processing method. The data processing system is configured to perform a hardware transactional memory (HTM) transaction. The data processing system comprises a byte-addressable nonvolatile memory for persistently storing data and a processor being configured to execute an atomic HTM write operation in connection with committing the HTM transaction by writing an indicator to the nonvolatile memory indicating the successful commit of the HTM transaction.

10 Claims, 4 Drawing Sheets

(51) Int. Cl.
  *G06F 12/0868* (2016.01)
  *G06F 11/14* (2006.01)
  *G06F 12/0804* (2016.01)

(52) U.S. Cl.
  CPC ...... *G06F 11/1474* (2013.01); *G06F 12/0868* (2013.01); *G06F 16/2365* (2019.01); *G06F 12/0804* (2013.01); *G06F 2212/1016* (2013.01)

(58) Field of Classification Search
  CPC ............. G06F 12/0804; G06F 11/1471; G06F 2212/1016
  USPC .................................................. 711/147, 100
  See application file for complete search history.

(56) References Cited

U.S. PATENT DOCUMENTS

| | | | |
|---|---|---|---|
| 2007/0156994 | A1 | 7/2007 | Akkary et al. |
| 2010/0100885 | A1 | 4/2010 | Groff et al. |
| 2010/0169894 | A1 | 7/2010 | Sheaffer et al. |
| 2013/0103908 | A1 | 4/2013 | Chung et al. |
| 2014/0237172 | A1* | 8/2014 | Shah ...................... G06F 9/466 711/103 |
| 2014/0351506 | A1* | 11/2014 | Santry ..................... G06F 3/064 711/114 |
| 2015/0169357 | A1 | 6/2015 | Busaba et al. |

FOREIGN PATENT DOCUMENTS

| | | |
|---|---|---|
| CN | 103299281 A | 9/2013 |
| CN | 104657153 A | 5/2015 |
| CN | 105339885 A | 2/2016 |
| JP | H05197598 A | 8/1993 |
| JP | 2009521767 A | 6/2009 |
| KR | 20000036144 A | 6/2000 |
| KR | 100954623 B1 | 4/2010 |
| KR | 20110085994 A | 7/2011 |
| KR | 20140049058 A | 4/2014 |

OTHER PUBLICATIONS

Sparsh Mittal et al., "A Survey of Architectural Approaches for Managing Embedded DRAM and Non-Volatile On-Chip Caches," IEEE Transactions on Parallel and Distributed Systems 26(6):1524-37 Jun. 2015.

Jishen Zhao et al., "Kiln: Closing the Performance Gap Between Systems with and Without Persistence Support," MICRO-46, Dec. 7-11, 2013. total 12 pages.

Stephen Tu et al., "Speedy Transactions in Multicore In-Memory Databases," SOSP '13, Nov. 3-6, 2013. pp. 18-32.

H.Q. Le et al., "Transactional memory support in the IBM POWER8 processor," IBM J. Res. & Dev. 59(1):Paper 8, Jan.-Feb. 2015, total 14 pages.

Dushyanth Narayanan et al., "Whole-System Persistence," ASPLOS'12, Mar. 3-7, 2012, total 10 pages.

Justin DeBrabant et al., "A Prolegomenon on OLTP Database Systems for Non-Volatile Memory," Proceedings of the VLDB Endowment 7(14) 2014. total 7 pages.

Viktor Leis et al., "Exploiting Hardware Transactional Memory in Main-Memory Databases," ICDE Conference 2014, pp. 580-591.

Intel Architecture Instruction Set Extensions Programming Reference, 319433-031, Jan. 2018, total 137 pages.

Joel Coburn et al., "NV-Heaps: Making Persistent Objects Fast and Safe with Next-Generation, Non-Volatile Memories," ASPLOS'11, Mar. 5-11, 2011, total 13 pages.

Maurice Herlihy et al., "Software Transactional Memory for Dynamic Sized Data Structures," PODC 2003, Jul. 13-16, 2003, total 10 pages.

Subramanya R. Dulloor et al., "System Software for Persistent Memory," EuroSys 2014, Apr. 13-16, 2014, total 15 pages.

Zhaoguo Wang et al., "Using Restricted Transactional Memory to Build a Scalable In-Memory Database," EuroSys 2014, Apr. 13-16, 2014, total 15 pages.

Zhaoguo Wang et al., "Persistent Transactional Memory," IEEE Computer Architecture Letters 14(1):58-61, Jan.-Jun. 2015 XP11585143A.

Youyou Lu et al., "Loose-Ordering Consistency for Persistent Memory," IEEE 2014, pp. 216-223 XP32695567.

Youyou Lu et al., "Blurred Persistence in Transactional Persistent Memory," 2015 IEEE, total 13 pages XP55224578A.

Haris Volos et al., "Mnemosyne: lightweight persistent memory," ASPLOS '11, Mar. 5-11, 2011, pp. 91-103 XP58001831A.

* cited by examiner

COHERENCE PROTOCOL FOR HARDWARE TRANSACTIONAL MEMORY IN SHARED MEMORY USING NON VOLATILE MEMORY WITH LOG AND NO LOCK

CROSS-REFERENCE TO RELATED APPLICATIONS

This application is a continuation of International Application No. PCT/EP2016/067403, filed on Jul. 21, 2016, which claims priority to International Patent Application No. PCT/EP2015/066802, filed on Jul. 22, 2015. The disclosures of the aforementioned applications are hereby incorporated by reference in their entireties.

TECHNICAL FIELD

The present invention relates to a data processing system and method and, in particular, to storage accesses to the shared memory of a data processing system.

BACKGROUND

In parallel programming computing environments, when parallel processor cores or programs share access to the same memory locations, this access must be properly managed and synchronized. In some such environments, a transactional memory paradigm may be employed to manage synchronized memory access by threads. According to a transactional memory approach, threads can speculatively execute transactions without altering the contents of shared memory locations until the transactions subsequently commit. If a conflict is detected between two transactions, one of the transactions may be aborted so that the other transaction can commit, at which time the committed transaction may alter the contents of the shared memory locations.

More specifically, a conventional multiprocessor computer system includes multiple processing units as well as one or more address, data and control buses. Coupled to the multiple processing units is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from system memory. In some multiprocessor systems, the cache hierarchy includes at least two levels. The level one (L1) or upper-level cache is usually a private cache associated with a particular processor core and cannot be accessed by other cores in a multiprocessor system. Typically, in response to a memory access instruction such as a load or store instruction, the processor core first accesses the directory of the upper-level cache. If the requested memory block is not found in the upper-level cache, the processor core then accesses lower-level caches (e.g., level two (L2) or level three (L3) caches) or system memory for the requested memory block. The lowest level cache (e.g., L3 cache) is often shared among several processor cores.

In such systems, multiprocessor software concurrently accesses shared data structures from multiple software threads. When concurrently accessing shared data it is typically necessary to prevent so-called "unconstrained races" or "conflicts". A conflict occurs between two memory accesses when they are to the same memory location and at least one of them is a write and there is no means to ensure the ordering in which those accesses occur.

Multiprocessor software typically utilizes lock variables to coordinate the concurrent reading and modifying of locations in memory in an orderly conflict-free fashion. A lock variable is a location in memory that is read and then set to a certain value, possibly based on the value read, in an atomic fashion. The read-modify-write operation on a lock variable is often accomplished utilizing an atomic-read-modify-write instruction or by a sequence of instructions that provide the same effect as a single instruction that atomically reads and modifies the lock variable.

In this manner, a software thread reading an initial "unlocked" value via an atomic-read-modify-write instruction is said to have "acquired" the lock and will, until it releases the lock, be the only software thread that holds the lock. The thread holding the lock may safely update the shared memory locations protected by the lock without conflict with other threads because the other threads cannot obtain the lock until the current thread releases the lock. When the shared locations have been read and/or modified appropriately, the thread holding the lock releases the lock (e.g., by writing the lock variable to the "unlocked" value) to allow other threads to access the shared locations in storage.

While locking coordinates the accesses of competing threads to shared data, locking suffers from a number of well-known shortcomings. These include, among others, firstly the possibility of deadlock when a given thread holds more than one lock and prevents the forward progress of other threads and secondly the performance cost of lock acquisition when the lock may not have been strictly necessary because no conflicting accesses would have occurred to the shared data.

To overcome these limitations, the notion of transactional memory can be employed. In transactional memory, a set of load and/or store instructions are treated as a "transaction." A transaction succeeds when the constituent load and store operations can occur atomically without a conflict with another thread. The transaction fails in the presence of a conflict with another thread and can then be re-attempted. If a transaction continues to fail, software may fall back to using locking to ensure the orderly access of shared data.

To support transactional memory, the underlying hardware tracks the storage locations involved in the transaction, i.e. the transaction footprint, as the transaction executes for conflicts. If a conflict occurs in the transaction footprint, the transaction is aborted and possibly restarted. Use of transactional memory reduces the possibility of deadlock due to a thread holding multiple locks because, in the typical case, no locks are held (the transaction simply attempts to make one or more storage accesses and restarts if a conflict occurs). Further, the processing overhead of acquiring a lock is generally avoided.

Transaction memory is known in the form of hardware transactional memory (HTM) and software transactional memory (STM). Hardware transactional memory (HTM) systems may comprise modifications in processors, cache and bus protocol to support transactions. Software transactional memory (STM) provides transactional memory semantics in a software runtime library or the programming language. Some future multicore processor generations will implement a form of hardware transactional memory (HTM), as can be taken from the document "Intel® Architecture Instruction Set Extensions Programming Reference".

SUMMARY

According to a first aspect of the invention, a data processing system configured to perform a hardware transactional memory (HTM) transaction, the data processing system comprising:
  a byte-addressable nonvolatile memory for persistently storing data; and
  a processor communicatively coupled to the byte-addressable nonvolatile memory and configured to:
  execute an atomic HTM write operation in connection with committing the HTM transaction; and
  write an indicator to the nonvolatile memory indicating a successful commit of the HTM transaction.

According to a first implementation form of the first aspect, the processor is coupled to a cache memory by a plurality of cache lines, with the cache memory configured to be used by the processor for caching data using a cache coherence protocol.

According to a second implementation form of the first aspect, the data processing system is further configured to log a write operation associated with the HTM transaction in the nonvolatile memory prior to the successful commit of the HTM transaction.

According to a third implementation form of the first aspect, the data processing system is further configured to log the write operation associated with the HTM transaction in the nonvolatile memory by transparently flushing the log of the write operation associated with the HTM transaction to the nonvolatile memory prior to the successful commit of the HTM transaction.

According to a fourth implementation form of the first aspect, the data processing system further comprises a recovery unit configured to redo the log upon a restart of the data processing system, if the log of the write operation associated with the HTM transaction is present in the nonvolatile memory and the HTM transaction is in a logged state, in particular the indicator is set, and set the HTM transaction to an unlogged state by unsetting the indicator if the redo of the transaction is completed.

According to a fifth implementation of the first aspect, the data processing system is further configured to flush operational data written by the HTM operation from the cache memory to the nonvolatile memory after the successful commit of the HTM transaction According to the sixth implementation form of the first aspect, the data processing system is further configured to set the HTM transaction to an unlogged state by unsetting the indicator after the successful commit of the HTM transaction.

According to a seventh implementation of the first aspect, the data processing system is further configured to transparently flush operational data written by the HTM operation from the cache memory to the nonvolatile memory without aborting the HTM transaction.

According to an eighth implementation form of the first aspect, the indicator indicating the successful commit of the HTM transaction comprises a HTM transaction identifier, in particular a commit record.

According to a second aspect, a data processing method for performing a hardware transactional memory (HTM) transaction comprises:
  a. executing an atomic HTM write operation in connection with committing the HTM transaction; and
  b. writing an indicator to a nonvolatile memory indicating a successful commit of the HTM transaction.

A first implementation form of the second aspect further comprises executing a write operation associated with the HTM transaction in the nonvolatile memory by transparently flushing the log of the write operation associated with the HTM transaction to the nonvolatile memory prior to the successful commit of the HTM transaction.

A second implementation form of the second aspect further comprises redoing the log upon a restart of the data processing system, if the log of the write operation associated with the HTM transaction is present in the nonvolatile memory and the HTM transaction is in a logged state, in particular setting the indicator, and setting the HTM transaction to an unlogged state by unsetting the indicator if the redoing of the transaction is completed.

A third implementation form of the second aspect further comprises flushing the data written by the HTM operation from the cache memory to the nonvolatile memory after the successful commit of the HTM transaction.

A fourth implementation form of the second aspect further comprises setting the HTM transaction to an unlogged state by unsetting the indicator after the successful commit of the HTM transaction.

A fifth implementation form of the second aspect further comprises transparently flushing operational data written by the HTM operation from the cache memory to the nonvolatile memory without aborting the HTM transaction.

According to a third aspect of the invention, a non-transitory computer readable medium having stored thereon computer-executable instructions that when executed by a processor cause the processor to perform operations for data processing, the operations comprising:
  a. executing an atomic HTM write operation in connection with committing the HTM transaction; and
  writing an indicator to a nonvolatile memory indicating a successful commit of the HTM transaction.

BRIEF DESCRIPTION OF THE DRAWINGS

Further embodiments of the invention will be described with respect to the following figures, in which.

DETAILED DESCRIPTION OF EMBODIMENTS

It is an object of the invention to provide an improved data processing system and method.

This object is achieved by the subject matter of the independent claims.

Further implementation forms are provided in the dependent claims, the description and the figures.

The present invention is based on the general idea to add a persistent indication atomically within a HTM commit and logging each HTM write, and flushing each HTM write after commit, to allow the hardware transactional memory (HTM) to maintain consistency and persistency in a non-volatile memory even through system failures.

In the following detailed description, reference is made to the accompanying drawings, which form a part of the invention, and in which are shown, by way of illustration, specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

It is understood that a invention in connection with a described method may also hold true for a corresponding device or system configured to perform the method and vice versa. For example, if a specific method step is described, a corresponding device or system may include a unit to perform the described method step, even if such unit is not explicitly described or illustrated in the figures. Further, it is understood that the features of the various exemplary aspects described herein may be combined with each other, unless specifically noted otherwise.

Figure 1:
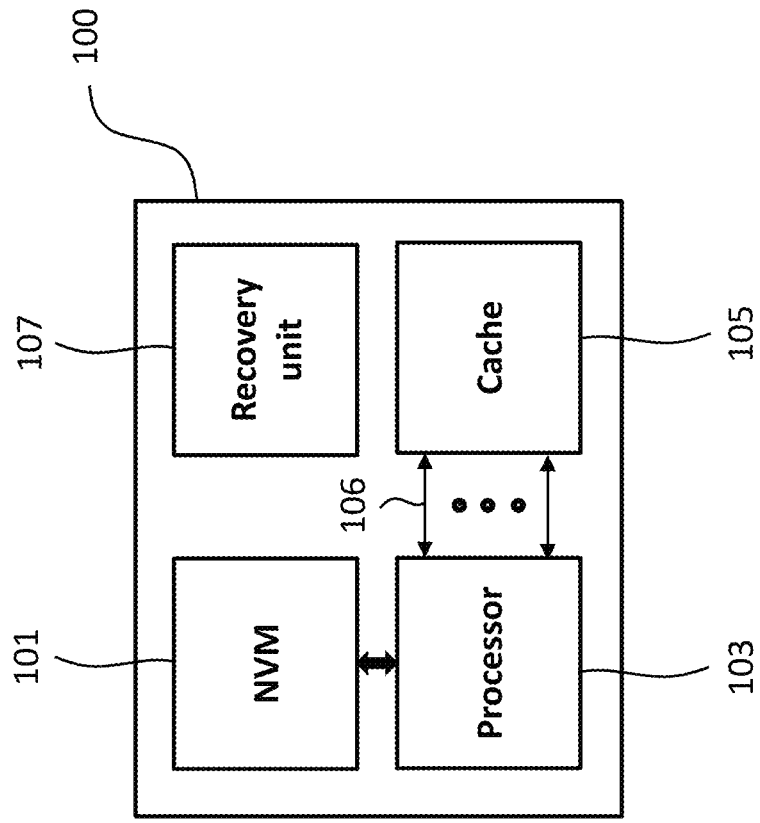
FIG. 1 shows a schematic diagram of a data processing system according to an embodiment.

FIG. 1 shows a schematic diagram of a data processing system 100 according to an embodiment. The data processing system 100 is configured to perform a hardware transactional memory (HTM) transaction. The data processing system 100 comprises a byte-addressable nonvolatile memory 101 for persistently storing data and a processor 103. The processor 103 is configured to execute an atomic HTM write operation in connection with committing the HTM transaction by writing an indicator to the nonvolatile memory indicating the successful commit of the HTM transaction. In an embodiment, the indicator can be a non-volatile bit in the commit of the HTM transaction.

Nonvolatile memory (NVM or NVRAM) is a byte-addressable memory which is durable, i.e. the data in the memory is persistent across power failures. According to the embodiment, the log records (including successful commit indicator) and application data are maintained in NVM.

According to an embodiment the HTM transaction needs to write log records and flush both log records and application data in the NVM without aborting itself or other live transactions. This requires a special type of flush instructions which are transparent to the HTM system, which we name transparent flushes (TF). Current architectures of major vendors employ flush instructions that do not evict the flushed address from the cache, which can potentially implement TF mechanism. For an example, a thread running an HTM transaction with the TSX block in X86 microarchitecture, writes a log record to the cache and then uses a CLWB instruction to flush the log record to the Log Records area in the NVM.

A recovery process reads the commit indicator from NVM after the machine restarts and if the commit indicator is set to true, which means the transaction was successful but is still logged, it reads the log records and writes to the Application Data area accordingly.

Figure 4:
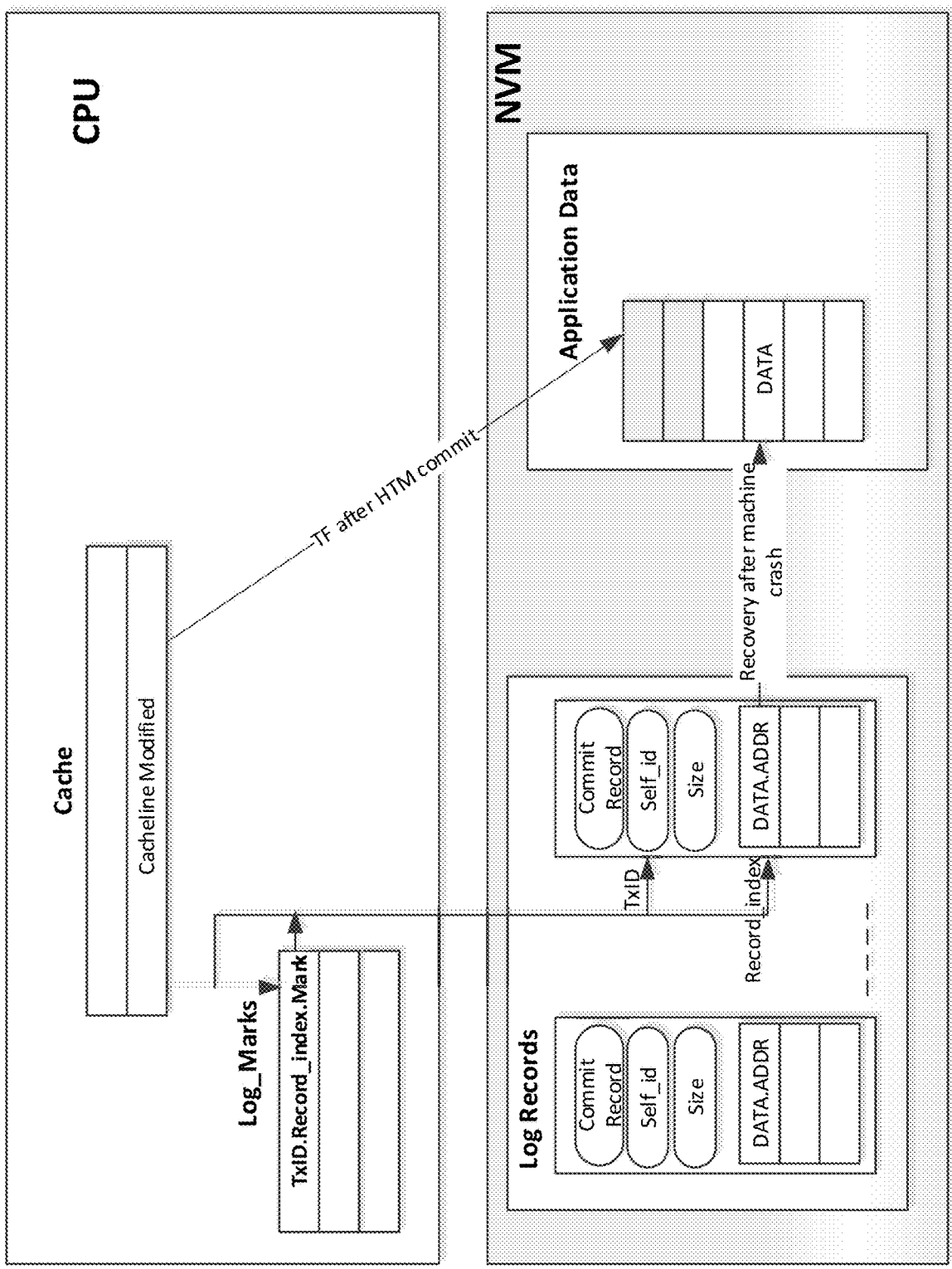
FIG. 4 shows a schematic diagram illustrating different aspects of a data processing system according to an embodiment and providing details about the implementation of each step.

According to an embodiment the indicator can be implemented by the commit record from FIG. 4. A successful commit is the point where the transaction writes are made visible atomically to all processing units in the system.

In an embodiment, the processor 103 is coupled to a cache memory 105 by a plurality of cache lines 106 and the cache memory 105 is configured to be used by the processor 103 for caching data using a cache coherence protocol.

In an embodiment, the data processing system 100 is further configured to create a log record in the Log Records area of the nonvolatile memory 101, and log the write operation of cached data associated with the HTM transaction into the Log Records area. The data structure of Log Records could be referred to FIG. 4, which, for example, includes Commit Record, Self_id, Size and <DATA, ADDR>tuples. Commit Record is the persistent successful commit indicator. Self id is the unique identifier of the transaction. <DATA, ADDR>tuple: A log record of the data and address of a single cache line as written by the transaction. Size is the number of log records in one transaction.

In an embodiment, the data processing system 100 is configured to log the write operation of cached data associated with the HTM transaction into the Log Records area by transparently flushing the log of the write operation of cached data associated with the HTM transaction to the nonvolatile memory 101 prior to the commit of the HTM transaction. A transparent flush is invisible to the cache memory 105 and to the HTM system.

In an embodiment, the data processing system 100 further comprises a recovery unit 107 configured to redo the log upon a restart of the data processing system 100, if the Commit Record is set to true and the log record data, associated with the HTM operation is present in the nonvolatile memory 101. Redo the log means rewriting application data area from Log Records area that is still in logged state and may not have been flushed to the nonvolatile memory 101 before a system failure, for instance, a power failure.

In an embodiment, the data processing system 100 is further configured to flush the modified application data associated with the HTM operation from the cache to the Application Data area in nonvolatile memory 101 after the commit of the HTM transaction.

In an embodiment, the data processing system 100 is further configured to transparently flush the modified application data associated with the HTM operation from the cache to the Log Records area in nonvolatile memory as in FIG. 4 101 before the commit of the HTM transaction and to the Application Data area in nonvolatile memory as in FIG. 4 101 after the commit of the HTM transaction without aborting a HTM transaction.

In an embodiment, the indicator indicating the successful commit of the HTM transaction comprises a HTM transaction commit record. The commit record can be a Boolean variable where a value true means the transaction is successfully committed. As long as the commit record is set, the writes of the transaction are in logged state and will be recovered in a restart.

Figure 2:
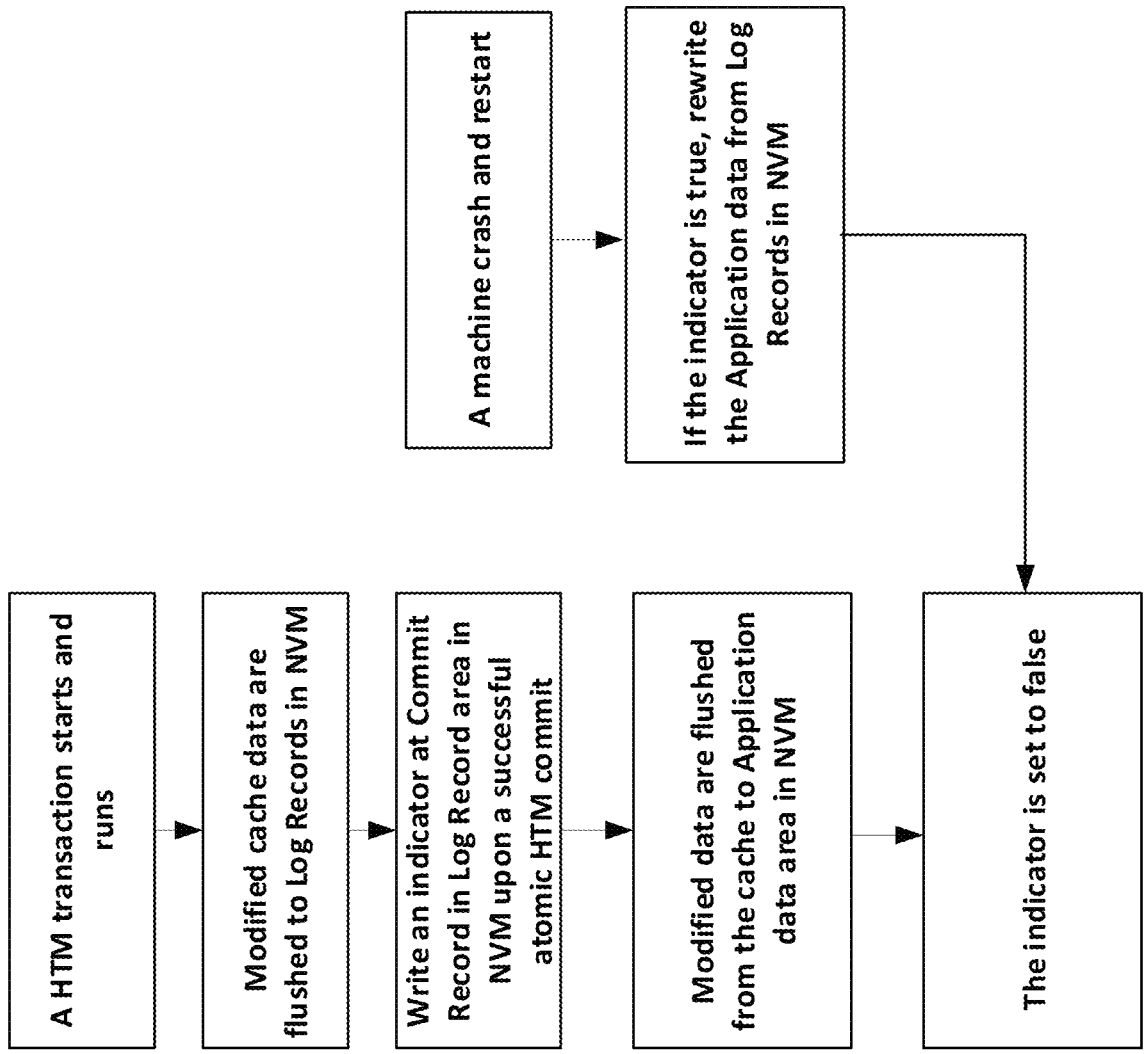
FIG. 2 shows a schematic diagram of a data processing method according to an embodiment.

FIG. 2 is a flow chart of the main stages of a persistent HTM transaction according to an embodiment.

It shows all the stages of a successful persistent HTM transaction:

Start an HTM transaction.

Write application data in cache and log it in log records in the Log Records area in NVM.

Commit the transaction successfully and at the same time, set the indicator to true in the commit record in the Log Records area in NVM.

If no failure—flush the modified application data from the cache to Application Data area in NVM.

If there was a failure, and the indicator is true, in restart, copy the modified application data from Log Records area in NVM to application data in Application Data area in NVM otherwise if the indicator is false, ignore the transaction.

Set the indicator to false in the commit record in the Log Records area in NVM.

In the following, further embodiments and implementation forms of the data processing system 100 and the data processing method 200 are described in more detail using the following notation and definitions.

A HTM transaction executed, for instance, by the processor 103, is denoted as $T_k$. A restart of the data processing system 100 brings the data to a consistent state, removing effects of uncommitted transactions and applying the missing effects of the committed ones (Restart). A transaction is finalized (Finalization) if it is committed successfully, and all its writes in cache are flushed to the Application Data area in the NVM 101 and the commit record is set to false and therefore the transaction is ignored if a subsequent restart happens. If a is a memory address in the cache 105, TF(α), referred to as a Transparent Flush, will write a to the nonvolatile memory, either in the Application Data area or the Log Records area, but will not invalidate it and will not affect the cache coherency in any way.

Figure 3:
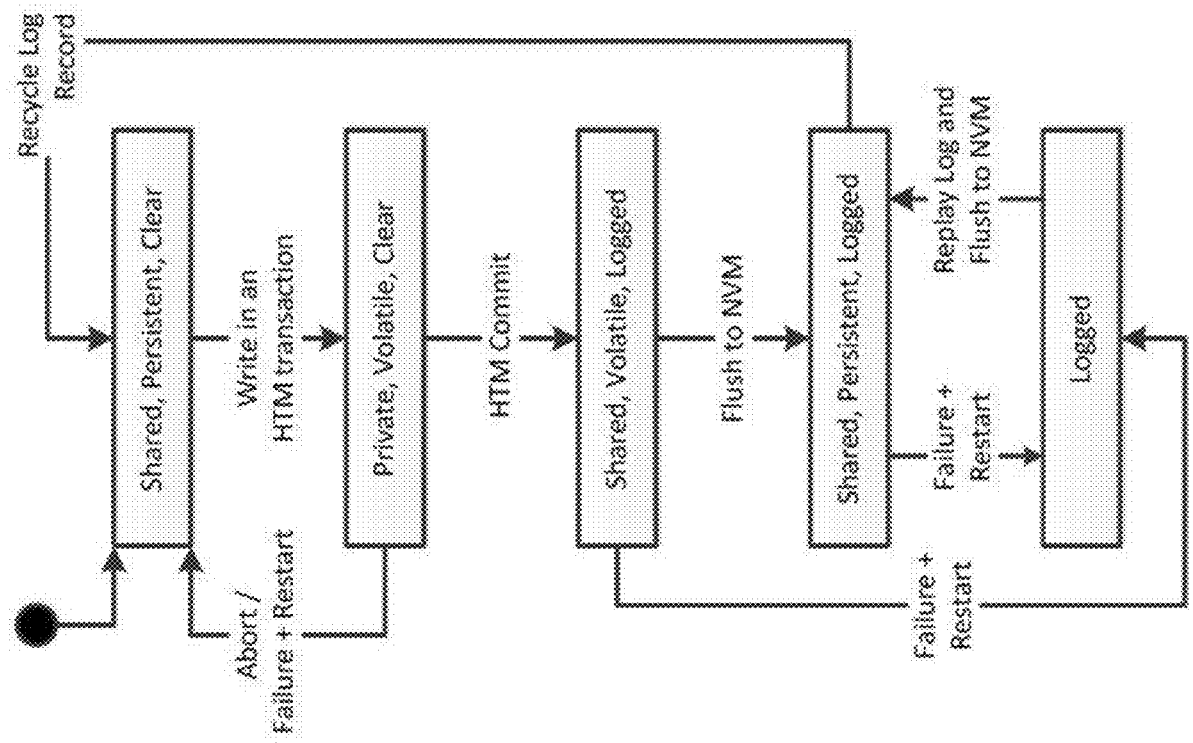
FIG. 3 shows a state diagram of a data processing system according to an embodiment.

In an embodiment, the state of a data item x (an addressable word) in the NVM 101, which is written by an HTM transaction T, is defined by the following three characteristics shown in FIG. 3. (1) "Private"/"Shared": "Private" means x is only in the L1 cache of one thread, and is not visible to other threads. When x is "Shared", the cache coherence makes its new value visible. (2) "Persistent"/"Volatile": "Persistent" means that the last write of x is in the NVM 101; otherwise the new value of x is "Volatile" in the cache 105 and will disappear on a power failure. (3) "Logged"/"Clear": When x is "Logged", a restart will recover x from the non-volatile log. If x is "Clear", the restart will not touch x, because its log record has been finalized or its transaction has not been successfully committed.

FIG. 3 shows the state machine of a single write in a HTM transaction that can be executed by a data processing system according to the present application, for instance the data processing system 100 shown in FIG. 1. According to an embodiment the mechanism makes the transition <"Private", "Clear"> to <"Shared", "Logged">atomic, and allows the transition <"Volatile"> to <"Persistent"> to not abort a concurrent HTM transaction that reads the item. Generally, the "Logged" characteristic is for the entire HTM transaction. Turning all writes of a single transaction from "Clear" to "Logged" requires a single persistent write. In a HTM commit according to an embodiment of the present application, all writes are exposed by the HTM and are simultaneously logged. In an embodiment, each write generates a persistent log record, but until a successful commit, the write is not logged in the sense that it will not be replayed by a restart process. FIG. 4 is a detailed flow chart of the actions in the different stages.

When the HTM transaction $T_k$ writes to a variable x, x is marked as transactional in the L1 cache, for instance, the cache 105 shown in FIG. 1, of the processor 103 and is "private", i.e., exclusively in the L1 cache 105 of the processor 103. It is "volatile", as it is only in the cache 105, and "clear", i.e., not "logged", as the transaction is not yet committed. Not logged implies that x will not be written by the restart process. Upon an abort or a power failure of the data processing system 100, the "volatile" and "private" value of x will be discarded and it will revert to its previous "shared" and "persistent" value.

In an embodiment, in the HTM commit the state of x changes twice. It becomes "shared", i.e. visible, and at the same time it is also "logged". In an embodiment, both changes happen atomically at a successful commit. After a successful commit, the HTM flushes the new value of x transparently to the NVM 101 and clears x. Clearing is first setting the commit record (indicator) to false, and in a second step unsetting the log mark. The log mark role is to verify an address is logged only by one transaction in the system and the restart process writes an address at most once by the last value that was written to the address by an HTM transaction. The log marks are an embodiment and not part of the claims in this patent. If there is a failure of the system 100 and restart thereof when x is "logged", the processor 103 is configured to write the committed value of x in the log record of x to the Application Data area in the NVM and then to clear x.

In an embodiment, the log record in the NVM 101 is not a typical sequential log. Instead, it can hold log records only for transactions that are either in-flight, or are committed by the HTM and their log records have not been recycled yet.

As the person skilled in the art will appreciate, if the L1 cache 105 was non-volatile, HTM would be persistent as is without any further modifications. A restart event could abort the in-flight transactions, and a committed HTM transaction, while in the cache 105, would be instantly persistent and not require any logging. However, due to hardware limitations, e.g. fast wear out and slow writes of the NVM 101, the cache hierarchy will stay in volatile SRAM for the foreseeable future.

As shown in FIG. 3, in an embodiment the successful commit of the transaction $T_k$ automatically sets the indicator, i.e. commit record of $T_k$ to true, as shown in FIG. 4. In an embodiment, this can be implemented by the processor 103 using a "tx_end_log($T_k$)" instruction. This instruction performs an HTM commit and sets the commit record of $T_k$. FIG. 4 shows schematically the layout of the persistent footprint of the transaction $T_k$ in the NVM 101 according to an embodiment. It includes the "logged" indicated which can serve as the commit record of $T_k$. The instruction "tx_end_log($T_k$)" writes the commit record in the NVM 101 and in addition sets the status of the writes of $T_k$ to "logged".

In an embodiment, the processor 103 is configured to flush modified data from the cache 105 to the NVM 103 by live transactions without aborting those transactions. During finalization of the transaction T, for instance, after the instruction "tx_end_log(T)", i.e. after HTM commit, flushing of the application data, written by T from the cache 105 to the Application Data area in NVM 103 does not abort ongoing concurrent transactions that read this value. In an embodiment, these flushes do not generate any coherency request and do not invalidate the data in the case 105. Such operations are herein referred to as transparent flushes (TF) as they have no effect on the cache hierarchy and the HTM subsystem.

In an embodiment, the processor 103 can provide an API for a HTM transaction including a "tx_start( )" and a "tx_end( )" function which start and commit an HTM transaction. Non-persistent HTM realizations include such functions. In persistent HTM "tx_start( )" is starting an HTM transaction, as in the volatile case, while "tx_end( )" is extended to flushing the transaction log records from the cache to the Log Records area in NVM, followed by a simultaneous HTM commit and indicator setting, called from an API such as "tx_end_log(T)" instruction, followed by flushing of the application data itself from cache to the Application Data area in NVM. In an embodiment, the machine store instructions can be replaced by a preprocessor with a function such as "tx_write(address, data, size)" function. The tx_write( ) function creates a log record in the Log Records area in NVM, e.g. by non-temporal writes, and writes the application data to cache of the application data.

In an embodiment, the log records and the size field that appear in the HTM transaction shown in FIG. 4 are flushed as part of the transaction, but not as part of the commit instruction. However, multiple writes to the same cache line can write to the same log record. Thus, in an embodiment, the log records are flushed only once before commit to prevent multiple flushes of the same data.

In an embodiment, the processor 103 is configured to follow a best effort policy in the sense that the processor 103 does not supply a progress guarantee. As a result, after a certain number of aborts in the conventional volatile HTM, the transaction must take a global lock and commit. However with a NVM, a global lock is not enough as the tentative writes may have already contaminated memory. Therefore, in an embodiment an undo log entry is created for every volatile HTM write. In an alternative embodiment, a full redo log is created before the first value is written to the NVM 101. The first embodiment reduces read after write overhead.

As already described above, with a volatile cache, such as the cache 105 shown in FIG. 1, and committed HTM transactions that accommodate all their writes in cache, in an embodiment the processor 103 is configured to log the writes in order to allow recovery in case a restart happened after HTM commit, when the writes were still volatile. In an embodiment, the processor 103 is configured such that all writes to the log reach the NVM 101 before an HTM commit, while all transactional writes stay in the cache 105. In an embodiment, the processor 103 is configured to flush the log to the NVM 101 without aborting the executing transaction, i.e. transparently, as already described above.

In an embodiment, the processor 103 is configured such that logging can provide a restart process with the last committed value for each logged variable x. In an embodiment, the processor 103 is configured to attach a version to x. In an embodiment, the processor 103 is configured to verify that x is logged only once in the system 100. If the appearance of x in multiple logs is allowed, then the latest version of the log of x should be kept.

In an embodiment, each address is allowed to appear at most in one log. To avoid instances of the same address in multiple logs, in an embodiment a volatile array of log marks, is added in which each memory address is mapped to one mark. In an embodiment, when a transaction is about to write x, it also marks x as logged. In an embodiment, until x is flushed, no other transaction is allowed to write it. The reason marks or indicators are used in an embodiment is to prevent a write to a variable that was already written to another transaction, but not yet flushed, so it is still logged. All other conflicts can be handled directly by the HTM. In an embodiment, the array of marks or indicators can be volatile, as in case of a restart it is known that the logged addresses are unique, and that the restart and recovery process do not create any new log records. After restart, a new and empty array of marks or indicators can be allocated according to an embodiment.

In an embodiment, the writing of the marks or indicators is a part of a transaction, i.e. if the transaction $T_k$ writes x, it also marks x and in committing, the writing and the marking will take effect simultaneously as they are both transactional writes, while at abort, they are both canceled. In an embodiment, as long as the mark is set, the value of x, which appears in the log of $T_k$, cannot be changed. Therefore, after x is flushed from the cache to the Application Data area in the NVM 101 and the commit record is set to false, the mark can be unset. It is important to emphasize that the transactional load instructions can ignore the marks and execute in full speed, which is a key advantage of HTM according to the present application as read transactions are processed in hardware speed.

FIG. 4 shows the persistent structure of the log records of a transaction T according to an embodiment. In an embodiment, T has a Boolean commit record as shown in FIG. 4, which is set in tx_end_log. In an embodiment, the commit record is written by the HTM commit microcode, thus it should reside on the fastest available nonvolatile memory. In an embodiment, the transaction also has a unique ID which is stored in self_id. In an embodiment, the transaction has a set of log records. In an embodiment, each log record, as shown in FIG. 4, consists from the data in a modified cache line and the address of that line in system memory. In an embodiment, the maximal total size of the data is equal to the size of the L1 cache 105, which is the maximal size of written and, thus, logged, data. In an embodiment, the size field is the number of log records in the log of the transaction. In an embodiment, logged and size can be united, assuming if size is zero the transaction is not logged. However, for the sake of clarity here they are treated separately. In an embodiment, all of the Log Records area from FIG. 4, of T is flushed to the NVM 101 only once, so if a cache line is written multiple times in the same transaction, the data of this line is flushed to the log only once before the commit of T.

In an embodiment, the DATA.ADDR field in the log record, which is the address and corresponding data of the application data in NVM, allows a restart process or a finalization to know which address and application data to write or flush. In an embodiment, the address is in a separate array, and not appended to the data, to avoid fragmentation of the cache. In an embodiment, a mapping of the address itself is used to occupy and free the mark in write instrumentation and finalization.

While a particular feature or aspect of the invention may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present invention. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. A multiprocessor system for performing a hardware transactional memory (HTM) transaction, the multiprocessor system comprising:
   a byte-addressable nonvolatile memory for persistently storing data; and
   a processor communicatively coupled to the byte-addressable nonvolatile memory, the processor configured to:
      execute an atomic HTM write operation in connection with committing the HTM transaction by writing an indicator to the nonvolatile memory, the indicator indicating a successful commit of the HTM transaction, the indicator comprising a commit record;
      create a log record of the HTM transaction in the nonvolatile memory, wherein a data structure of the log record comprises: (1) the commit record, (2) a unique identifier of the HTM transaction, (3) data and an address of a cache memory associated with the HTM transaction, and (4) a size of the log record;
      log a write operation associated with the HTM transaction in the nonvolatile memory prior to the successful commit of the HTM transaction;
      flush operational data written by the HTM operation from the cache memory to the nonvolatile memory without aborting the HTM transaction;
      set the HTM transaction to an unlogged state by unsetting the indicator, after the successful commit of the HTM transaction; and
      evict the flushed address from the cache memory.

2. The multiprocessor system of claim 1, wherein the processor is coupled to the cache memory by a plurality of cache lines, with the cache memory configured to be used by the processor for caching data using a cache coherence protocol.

3. The multiprocessor system of claim 1, wherein the multiprocessor system is further configured to log the write operation associated with the HTM transaction in the nonvolatile memory by transparently flushing the log of the write operation associated with the HTM transaction to the nonvolatile memory prior to the successful commit of the HTM transaction.

4. The multiprocessor system of claim 1, wherein the multiprocessor system further comprises a recovery unit configured to
   redo the log upon a restart of the multiprocessor system, if the log of the write operation associated with the HTM transaction is present in the nonvolatile memory and the HTM transaction is in a logged state, in particular the indicator is set; and
   set the HTM transaction to the unlogged state by unsetting the indicator if the redo of the transaction is completed.

5. A method for performing a hardware transactional memory (HTM) transaction in a multiprocessor system, the method comprising:
   executing an atomic HTM write operation in connection with committing the HTM transaction by writing an indicator to a nonvolatile memory, the indicator indicating a successful commit of the HTM transaction, the indicator comprising a commit record;
   creating a log record of the HTM transaction in the nonvolatile memory, wherein a data structure of the log record comprises: (1) the commit record, (2) a unique identifier of the HTM transaction, (3) data and an address of a cache memory associated with the HTM transaction, and (4) a size of the log record;
   logging a write operation associated with the HTM transaction in the nonvolatile memory prior to the successful commit of the HTM transaction;
   flushing operational data written by the HTM operation from the cache memory to the nonvolatile memory without aborting the HTM transaction;
   setting the HTM transaction to an unlogged state by unsetting the indicator, after the successful commit of the HTM transaction; and
   evicting the flushed address from the cache memory.

6. The method of claim 5 further comprising executing a write operation associated with the HTM transaction in the nonvolatile memory by transparently flushing the log of the write operation associated with the HTM transaction to the nonvolatile memory prior to the successful commit of the HTM transaction.

7. The method of claim 5 further comprising redoing the log upon a restart of the multiprocessor system, if the log of the write operation associated with the HTM transaction is present in the nonvolatile memory and the HTM transaction is in a logged state, in particular setting the indicator and setting the HTM transaction to the unlogged state by unsetting the indicator if the redoing of the transaction is completed.

8. The method of claim 5, wherein the logging the write operation associated with the HTM transaction in the nonvolatile memory comprises transparently flushing a log of the write operation associated with the HTM transaction to the nonvolatile memory.

9. A non-transitory computer readable medium having stored thereon computer-executable instructions that when executed by a processor cause the processor to perform operations for performing a hardware transactional memory (HTM) transaction in a multiprocessor system, the operations comprising:
   executing an atomic HTM write operation in connection with committing the HTM transaction by writing an indicator to a nonvolatile memory, the indicator indicating a successful commit of the HTM transaction, the indicator comprising a commit record;
   create a log record of the HTM transaction in the nonvolatile memory, wherein a data structure of the log record comprises: (1) the commit record, (2) a unique identifier of the HTM transaction, (3) data and an address of a cache memory associated with the HTM transaction, and (4) a size of the log record;
   logging a write operation associated with the HTM transaction in the nonvolatile memory prior to the successful commit of the HTM transaction;
   flushing operational data written by the HTM operation from the cache memory to the nonvolatile memory without aborting the HTM transaction;
   setting the HTM transaction to an unlogged state by unsetting the indicator, after the successful commit of the HTM transaction; and
   evicting the flushed address from the cache memory.

10. The non-transitory computer readable medium of claim 9, wherein the logging the write operation associated with the HTM transaction in the nonvolatile memory comprises transparently flushing a log of the write operation associated with the HTM transaction to the nonvolatile memory.

\* \* \* \* \*